United States Patent [19]

Yamamoto et al.

[11] Patent Number: 4,995,704
[45] Date of Patent: Feb. 26, 1991

[54] LIQUID CRYSTAL DISPLAY DEVICE

[75] Inventors: Tomiaki Yamamoto, Chigasaki; Akio Murayama, Kamakura; Susmu Kondo, Yokosuka; Hitoshi Hato, Yokohama; Shinichi Kamagami, Yokohama; Shoichi Matsumoto, Yokohama, all of Japan

[73] Assignee: Kabushiki Kaisha Toshiba, Asaki, Japan

[21] Appl. No.: 376,541

[22] Filed: Jul. 7, 1989

Related U.S. Application Data

[63] Continuation-in-part-of Ser. No. 376,659 and 376,653, both filed Jul. 7, 1989 which is a continuation of Ser. No. 385,535 filed Jul. 25, 1989

[30] Foreign Application Priority Data

Jul. 8, 1988 [JP] Japan .................. 63-169014
Jul. 8, 1988 [JP] Japan .................. 63-169017

[51] Int. Cl.$^5$ ................................................ G02F 1/13
[52] U.S. Cl. ..................................... 350/334; 350/337; 350/347 R
[58] Field of Search ............... 350/334, 337, 339 R, 350/347 R

[56] References Cited

U.S. PATENT DOCUMENTS 3,912,369 10/1975 Kashnow .................. 350/347 R
4,852,976 8/1989 Suzuki ....................... 350/339 R
4,909,606 3/1990 Wada et al. ............... 350/347 R

FOREIGN PATENT DOCUMENTS 0246842 11/1987 European Pat. Off. ............ 350/335
2028527 7/1979 United Kingdom ............ 350/347 R
2171549A 8/1986 United Kingdom ............ 350/347 R Primary Examiner—Stanley D. Miller
Assistant Examiner—Huy K. Mai
Attorney, Agent, or Firm—Cushman, Darby & Cushman

[57] ABSTRACT

The present invention discloses a liquid crystal display device including a liquid crystal cell, the liquid crystal cell including two substrates which are arranged substantially parallel to each other and have electrodes on opposing surfaces thereof, and a liquid crystal composition held between the substrates such that the liquid crystal molecules are arranged in a twisted mode, first and second polarizers arranged at both sides of the liquid crystal cell, and first and second optical delay plates arranged between the liquid crystal cell and the second polarizer, wherein assuming that a retardation value of the liquid crystal cell is given by:

$$R_0 = \Delta n \cdot d \cdot \cos^2 \theta$$

where $\Delta n$ is the optical anisotropy of the liquid crystal composition, d is the distance between the two substrates in the liquid crystal cell, and $\theta$ is the tilt angle of the liquid crystal composition, a total of the retardation values of the first and second optical delay plates is $R_0 \times 0.8$ to $R_0 \times 1.2$. A display obtained by the liquid crystal display device of this invention is a high-contrast, bright, and achromatic b/w display. The liquid crystal display device of this invention has a wide viewing angle and is inexpensive.

4 Claims, 4 Drawing Sheets

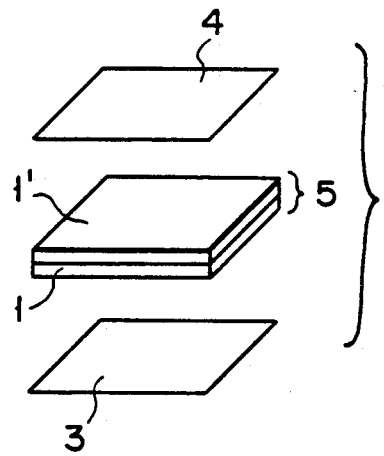
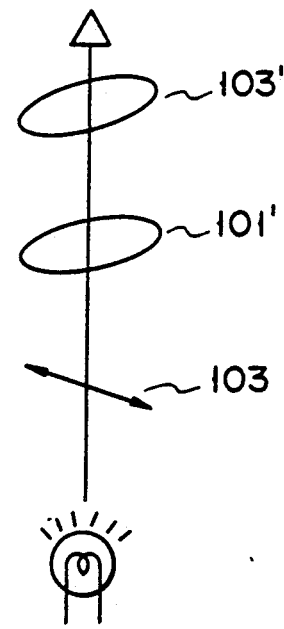
F I G. 1A  F I G. 1B
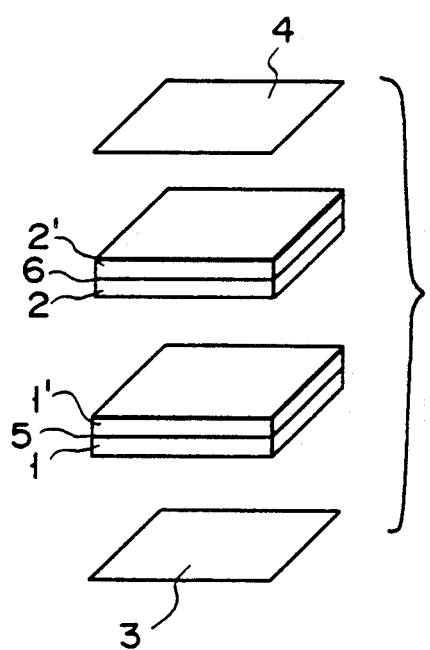
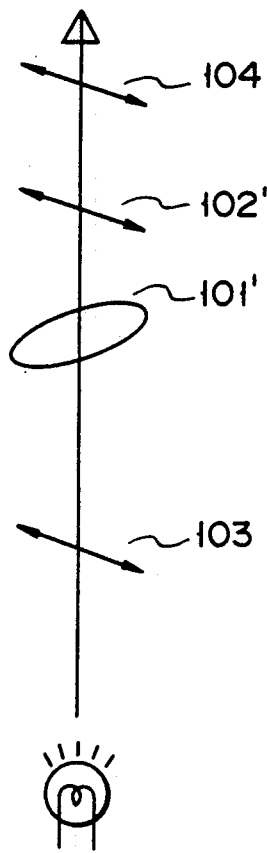
F I G. 2A  F I G. 2B

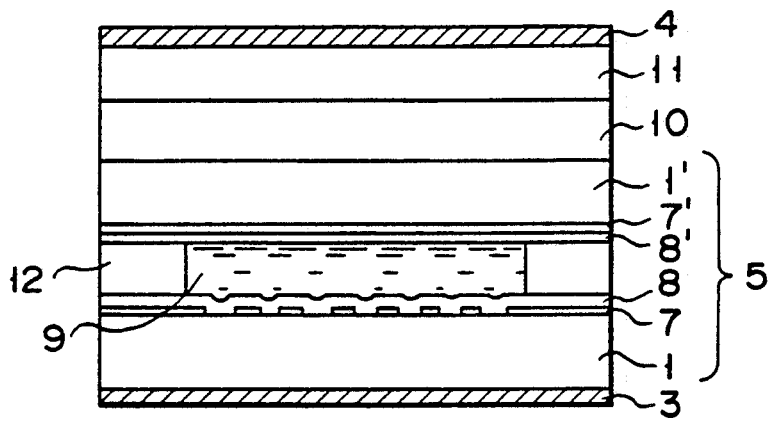
F I G. 3
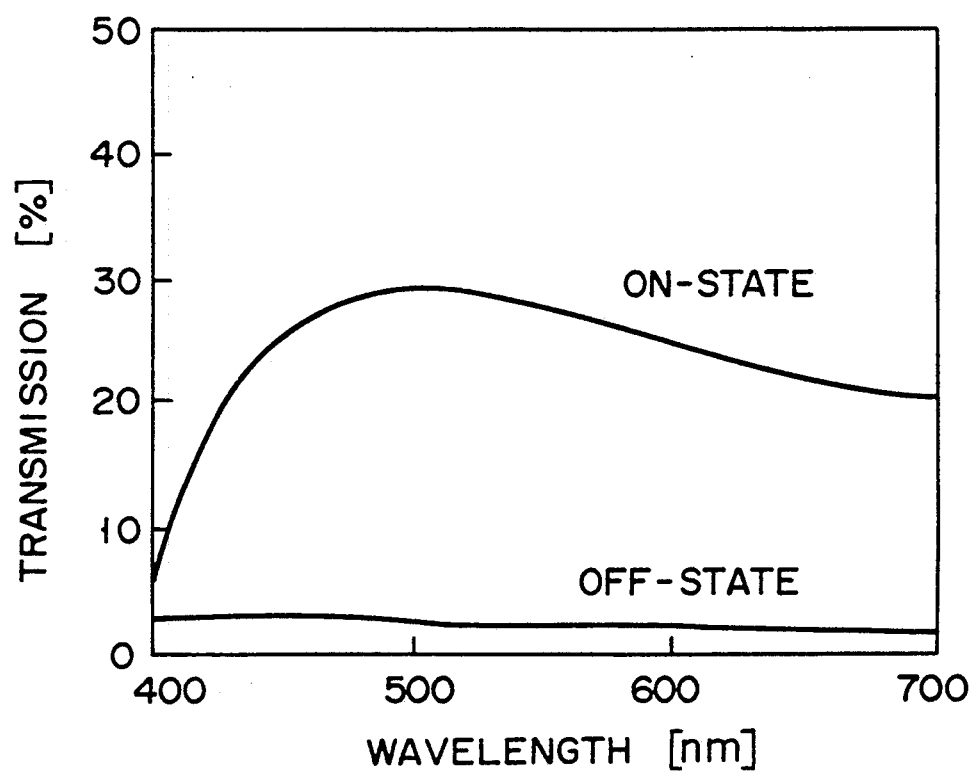
F I G. 6

LIQUID CRYSTAL DISPLAY DEVICE

RELATED APPLICATIONS

This application is related to application Ser. No. 07/376,659 and 07/376,653, both filed Jul. 7, 1989 and to application Ser. No. 07/385,535 filed Jul. 25, 1989.

BACKGROUND OF THE INVENTION

1. Field of the Invention

The present invention relates to a liquid crystal display device suitable for an achromatic black and white (b/w) display.

2. Description of the Prior Art

Conventional liquid crystal display devices can be classified into, e.g., a TN type, a DS (dynamic scattering) type, a GH type, a DAP (deformation of aligned phases) type, and a thermal write type in accordance with their operation modes. Of these devices, the TN liquid crystal display device has been often used as a display device for a portable calculator, a measuring instrument, and the like.

In recent years, a higher information content and a larger display area have been required for a display device for use in a wordprocessor, a personal computer, and the like. However, the conventional TN liquid crystal display device has problems of, e.g., an insufficient contrast and a narrow viewing angle. In this case, the viewing angle is taken to mean an angle at which a display can be clearly seen. For this reason, the TN liquid crystal display device cannot satisfy the above requirements. Therefore, a demand has arisen for a liquid crystal device having a new operation mode satisfying the above requirements.

As a liquid crystal display device capable of satisfying these requirements, Japanese Patent Disclosure (Kokai) No. 60-10702 discloses an electrically controlled birefringence, supertwisted birefringence effect (SBE) liquid crystal display device. This SBE liquid crystal display device comprises a cell obtained by sealing two transparent substrates arranged to oppose each other by a distance of 3 to 12 μm. Transparent electrodes are formed on at least opposing surfaces of the two transparent substrates, respectively. A nematic liquid crystal is filled in the cell. Examples of the nematic liquid crystal for use in the SBE liquid crystal cell are cyclohexane-, ester-, biphenyl-, and pyrimidine-based liquid crystals. A chiral agent is added to the nematic liquid crystal so that the molecular axes of the liquid crystal molecules are rotated through an angle of 180° to 360° between the pair of substrates. In addition, since an alignment film is formed on the surface in contact with a liquid crystal of the substrate, the molecular axis of the liquid crystal has a tilt angle ($\theta$) larger than 5° with respect to the substrate surface. Retardation R of this liquid crystal cell is given by:

$$R = \Delta n \cdot d \cdot \cos^2 \theta$$

The value of the retardation R is 0.6 to 1.4 μm. In the above equation, $\Delta n$ represents the optical anisotropy of a liquid crystal composition in the liquid crystal cell, d is the cell thickness (substrate spacing), and $\theta$ is the tilt angle.

Of the SBE liquid crystal display devices, a device in which the molecule axes of the liquid crystal are rotated through 270° is well known. In this device, polarizers are preferably arranged in front and rear of a liquid crystal cell. Most preferably, a transmission axis of the front polarizer arranged in front of the liquid crystal cell has an angle of about 30° clockwise with respect to an alignment direction of liquid crystal molecules on the front substrate of the liquid crystal cell, and a transmission axis of the rear polarizer arranged in rear of the liquid crystal cell has an angle of about 30° counterclockwise or about 60° clockwise with respect to an alignment direction of liquid crystal molecules on the rear substrate. When the angle defined between the transmission axis of the rear polarizer and the molecular axis of the liquid crystal molecule on the rear substrate is about 30° counterclockwise, bright yellow is displayed in a nonselect state, and black is displayed in a select state (yellow mode). When the angle is about 60° clockwise, deep blue is displayed in the nonselect state, and white is displayed in the select state (blue mode).

In the SBE liquid crystal display device, light transmission largely changes in accordance with even a small change in voltage applied to the device. Therefore, according to the SBE liquid crystal display device, even in case of a display with a large line number operated a multiplexing drive, a high contrast and a wide viewing angle can be obtained.

SID' 86 DIGET, P. 122 describes a supertwisted (ST) liquid crystal display device in which a tilt angle is decreased and a twist angle of liquid crystal molecule is 100° to 200°. A term "twist angle" means an angle between a molecular axis of a liquid crystal molecule on one substrate and that on the other substrate.

Japanese Patent Disclosure (Kokai) No. 60-73525 discloses a liquid crystal display device using a liquid crystal cell in which retardation R is 0.5 to 0.8 μm and a twist angle of liquid crystal molecule is 270°. In this liquid crystal display device, two polarizers are arranged to sandwich the liquid crystal cell. According to this patent disclosure, it is preferred that an angle defined between optical axes of the two polarizers is substantially 90° and the optical axis of either of the two polarizers is set in a direction at which the twist angle of the liquid crystal into two.

A basic arrangement of the SBE or ST liquid crystal display device is shown in FIG. 1A. As shown in FIG. 1A, the SBE or ST liquid crystal display device has a liquid crystal cell 5, and two polarizers 3 and 4 arranged to sandwich the liquid crystal cell 5. The cell 5 comprising opposing substrates 1 and 1', and a liquid crystal composition held between the substrates. A polarization state of light transmitting through the device shown in FIG. 1A is shown in FIG. 1B. Light emitted from a light source is transmitted through the polarizer 3 to become linearly polarized light 103. The light 103 is transmitted through the cell 5 to become elliptically polarized light 101'. The shape of this ellipse is determined by a twist angle $\Psi$ of a liquid crystal of the cell 5, retardation R, and a wavelength $\lambda$ of the light. A part of the light 101' transmitted through the cell 5 is transmitted through the polarizer 4 and sensed by a human eye.

As described above, the transmission of the light in the above liquid crystal display device depends on the shape of the ellipse of the elliptically polarized light produced upon transmission through the liquid crystal cell. And the shape of the ellipse of the eliptically polarized light depends on the wavelength of the light. Therefore, the light transmitted through the device generally becomes chromatic. For example, as described above, the SBE liquid crystal display device exhibits yellow (yellow mode) or blue (blue mode) color in the nonselect state. This property is sometimes effective in special applications. However, the property is undesirable when these liquid crystal display devices are used as display units for a personal computer and office equipment. In addition, when the display surface is chromatic, its readability is evaluated to be inferior to that of a b/w display.

The TN liquid crystal display device can be used as a color display unit by arranging a color filter on a substrate. In the above liquid crystal display device, however, since the display surface becomes chromatic, its color reproducibility degrades.

In addition, the color of the above liquid crystal display device largely changes in accordance with viewing angle or temperature.

As a device which solves the above problems, Appl. Phys. Lett. 50(5), 1987, P. 236 describes an OMI liquid crystal display device. In this OMI liquid crystal display device, a twist angle of liquid crystal molecule is 180° and the value of retardation R is 0.5 to 0.6 μm. This device has two polarizers arranged such that a transmission axis of one of the polarizers is parallel to a rubbing axis of a substrate and an angle defined between absorbing axes of the two polarizers is 90°.

In the OMI liquid crystal display device, however, a change in transmission of the liquid crystal is not so large as compared with a change in voltage to be applied to the liquid crystal. Therefore, when a drive duty ratio is decreased, problems such as an insufficient contrast ratio, a narrow viewing angle, and a dark background arise.

Double-cell ST (D-ST) liquid crystal display devices disclosed in Japanese Patent Disclosure (Kokai) Nos. 57-46227, 57-96315, and 57-125919 can solve the problems of the OMI liquid crystal display device, especially, the problems of a dark background and insufficient contrast. As shown in FIG. 2A, each ST liquid crystal display device comprises two adjacent liquid crystal cells 5 and 6, and two polarizers 3 and 4 arranged in front and rear of the cells 5 and 6, respectively. The cells 5 and 6 have substantially the same retardation values and absolute value of twist angles of liquid crystal molecule in the cells. The cells 5 and 6 are arranged such that twist directions of liquid crystal molecule in the cells 5 and 6 are opposite to one another. A term "twist direction" means a direction along which the liquid crystal molecules are spirally arranged.

A polarization state of light through the liquid crystal display device having the above arrangement is shown in FIG. 2B. Light emitted from a light source is transmitted through the first polarizer 3 to become linearly polarized light 103. The light 103 is then transmitted through the first liquid crystal cell 5 to become elliptically polarized light 101'. The light 101' is transmitted through the second liquid crystal cell 6 to become linearly polarized light 102'. This is because the cell 6 has substantially the same retardation and twist angle as those of the cell 5 and has the twist direction of liquid crystal molecule opposite to that of the cell 5. The light 102' transmitted through the cell 6 is transmitted through or absorbed by the second polarizer 4 in accordance with the direction of a vibration surface.

In this D-ST liquid crystal display device, it is important that the first and second liquid crystal cells 5 and 6 optically complement each other. For this purpose, in particular, the retardation values of the cells must be substantially equal to each other. A difference between the retardation values of the two liquid crystal cells is, e.g., ±0.05 μm.

In this D-ST liquid crystal display device, electrodes are formed on substrates 1 and 1' of the cell 5 and driven as in a normal dot-matrix liquid crystal display device. The cell 6 is, however, used to simply compensate the elliptically polarized light produced by the cell 5 and therefore need not be driven. Therefore, it is not necessary an electrode is formed on substrates 2 and 2'.

The D-ST liquid crystal display device can provide an achromatic b/w display. This means that all the incident light components can be effectively used. Therefore, since a light amount on the display surface is large, a bright screen can be obtained. In addition, the number of scanning lines can be increased in this D-ST liquid crystal display device.

This D-ST liquid crystal display device uses two liquid crystal cells requiring high manufacturing precision. Therefore, a manufacturing cost is increased to result in an expensive device. Furthermore, the viewing angle of this D-ST liquid crystal display device, however, is narrower than those of the SBE and OMI liquid crystal display devices.

SUMMARY OF THE INVENTION

It is therefore an object of the present invention to provide an achromatic b/w liquid crystal display device having a large contrast ratio and a wide viewing angle.

A liquid crystal display device according to the present invention comprises:

a liquid crystal cell including two substrates which are arranged substantially parallel to each other and have electrodes on opposing surfaces thereof, and a liquid crystal composition held between the substrates such that the liquid crystal molecules are arranged in a twisted mode;

first and second polarizers arranged at both sides of the liquid crystal cell; and first and second optical delay plates arranged between the liquid crystal cell and the second polarizer;

wherein assuming that a retardation value of the liquid cell is given by:

$$R_0 = \Delta n \cdot d \cdot \cos^2 \theta$$

where $\Delta n$ is the birefringence index of the liquid crystal composition, d is the distance between the two substrates in the liquid crystal cell, and $\theta$ is the tilt angle of the liquid crystal composition, a total of the retardation values of the first and second optical delay plates is $R_0 \times 0.8$ to $R_0 \times 1.2$.

According to the liquid crystal display device of the present invention, an achromatic b/w display, which is bright and has a high contrast and a wide viewing angle, can be obtained. In addition, the liquid crystal display device of the present invention is inexpensive.

BRIEF DESCRIPTION OF THE DRAWINGS

FIG. 1A is an exploded perspective view schematically showing a basic arrangement of a conventional SBE or ST liquid crystal display device;

FIG. 1B is a schematic view showing a polarization state of light transmitting through the liquid crystal display device shown in FIG. 1A;

FIG. 2A is an exploded perspective view schematically showing an arrangement of a conventional D-ST liquid crystal display device;

FIG. 2B is a schematic view showing a polarization state of light transmitting through the liquid crystal display device shown in FIG. 2A;

FIG. 3 is a sectional view according to an embodiment of a liquid crystal display device of the present invention;

FIG. 6 is a graph showing a transmission change of the liquid crystal display device according to the present invention with respect to a wavelength change;

DETAILED DESCRIPTION OF THE PREFERRED EMBODIMENT

Figure 5B:
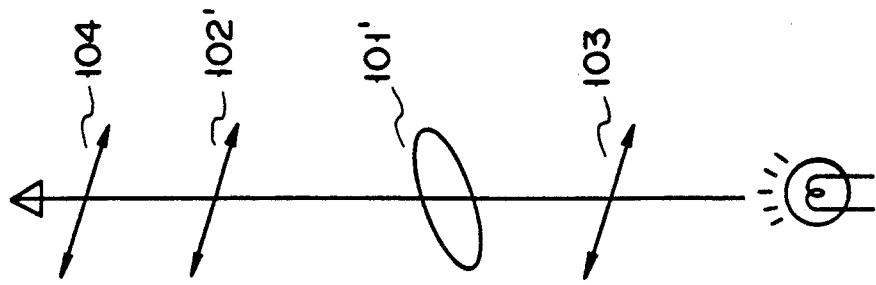
FIG. 5B is a view showing a polarization state of light transmitting through the liquid crystal display device shown in FIG. 5A.
Figure 5A:
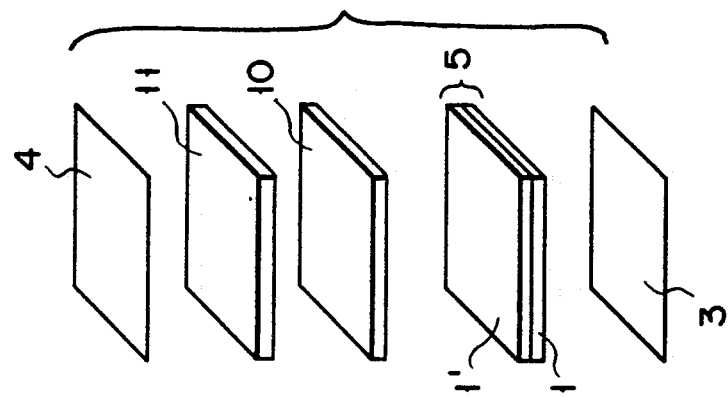
FIG. 5A is an exploded perspective view according to the embodiment of the liquid crystal display device of the present invention.

A liquid crystal display device of the present invention will be described below with reference to the accompanying drawings.

FIG. 3 is a section view showing an embodiment of a liquid crystal display device of the present invention, and FIGS. 4A to 4E are views showing alignment directions of liquid crystal molecules on substrate surfaces of a liquid crystal cell of the liquid crystal display device shown in FIG. 3, directions of absorbing axes of polarizers thereof, and directions of optical axes of optical delay plates thereof. Referring to FIGS. 4A to 4E, each rectangle S represents a plane parallel to the substrates of liquid crystal device. In each of FIGS. 4A to 4E, an angle of axis is defined on the basis of a reference line RL considering that the liquid crystal display device is one system. In this case, a counterclockwise direction from the reference line is represented by "+", and a clockwise direction therefrom is represented by "−".

Referring to FIG. 3, a liquid crystal cell 5 has substantially parallel substrates 1 and 1'. Transparent electrodes 7 are normally formed on the substrates 1 and 1'. A spacing between the two substrates is normally 6 to 7.5 μm. The substrates 1 and 1' are sealed and fixed by a sealing agent 12 such as an epoxy resin. A liquid crystal composition 9 is filled between the sealed substrates 1 and 1'.

A nematic liquid crystal is normally used as a liquid crystal to be filled in the cell 5. Preferable examples of the nematic liquid crystal are cyclohexane-, ester-, biphenyl-, and pyrimidine-based liquid crystals. In order to twist or rotate liquid crystal molecules spirally through an angle of 180° to 360° between the substrates 1 and 1', one or more chiral agents are added to the nematic liquid crystal. A conventional chiral agent can be used as the chiral agent to be added to the liquid crystal.

Figures 4A, 4B, 4C, 4D, 4E:
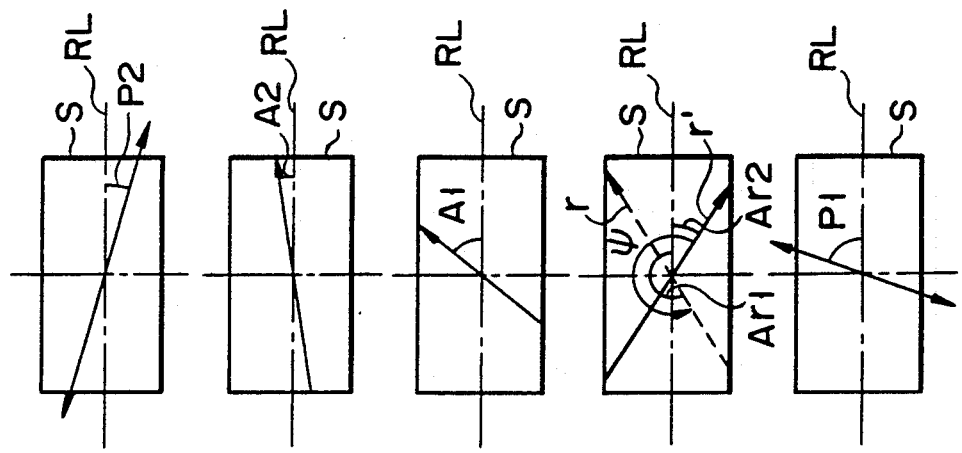
FIG. 4A is a view showing a direction of an absorbing axis of a second polarizer of the liquid crystal display device shown in FIG. 3.
FIG. 4B is a view showing a direction of an optical axis of a second optical delay plate of the liquid crystal display device shown in FIG. 3.
FIG. 4C is a view showing a direction of an optical axis of a first optical delay plate of the liquid crystal display device shown in FIG. 3.
FIG. 4D is a view showing alignment directions of liquid crystal molecules on substrate surfaces of a liquid crystal cell of the liquid crystal display device shown in FIG. 3.
FIG. 4E is a view showing a direction of an absorbing axis of a first polarizer of the liquid crystal display device shown in FIG. 3.

Alignment films 8 and 8' are formed on opposing surfaces of the substrates 1 and 1'. Each film 8 or 8' defines an alignment direction of a molecular axis of a liquid crystal molecule on the substrate surface. Therefore, a twist angle of a liquid crystal can be controlled between the substrates 1 and 1'. That is, as shown in FIG. 4D, a twist angle $\Psi$ of the liquid crystal is determined by an alignment direction r of the alignment film 8 on the substrate 1 and an alignment direction r' of the alignment film 8' on the substrate 1'. As a method of defining an alignment direction of a liquid crystal molecule on the substrate surface of the liquid crystal cell, known techniques such as rubbing can be used.

The twist angle of the liquid crystal molecules is preferably large so that an alignment angle of the liquid crystal molecule drastically changes in accordance with even a small voltage change. A preferable twist angle is 180° to 270°.

Assuming that an optical anisotropy of the liquid crystal composition of the cell 5 is $\Delta n$, a distance between the substrates thereof is d, and a tilt angle of the liquid crystal composition is $\theta$, a retardation $R_0$ of the cell 5 is given by:

$$R_0 = \Delta n \cdot d \cdot \cos^2 \theta$$

First and second optical delay plates 10 and 11 are arranged in the order named at the opposite side of the substrate 1' of the cell 5 against to the substrate 1 thereof. As shown in FIGS. 4C and 4B, optical axes of the first and second plates 10 and 11 have angles of $A_1$ and $A_2$, respectively, with respect to the reference line. These optical delay plates cancel a phase shift of light generated upon transmission of the light through the cell 5. Retardation values of the plates 10 and 11 are set such that a total of the retardation values becomes $R_0 \times 0.8$ to $R_0 \times 1.2$. In this case, $R_0$ represents the retardation value of the liquid crystal cell as described above. When this condition is satisfied, a b/w display having a high contrast can be obtained. More preferably, the retardation value of each of the plates 10 and 11 is 0.25 to 0.45 μm. It is desirable that the retardation values of the optical delay plates 10 and 11 are equal to each other in view of mass production thereof. As an optical delay plate for use in the liquid crystal display device of the present invention, a stretched film such as a stretched polyvinyl alcohol, for example, can be used. In this case, a stretching direction of the stretched film corresponds to an optical axis of an optical delay plate.

A second polarizer 4 is arranged at a side of the second plate 11, the other side of the second plate facing to the first plate 10. A first polarizer 3 is arranged at the opposite side of the cell 5 against to the first plate 10. Directions of absorbing axes of the polarizers 3 and 4 are shown in FIGS. 4E and 4A, respectively. The polarizers 3 and 4 are arranged such that their absorbing axes form angles of P1 and P2, respectively, with respect to the reference line.

A polarization state of light transmitting through the liquid crystal display device of the present invention is shown in FIG. 5B. Light incident on the liquid crystal display device is polarized by the polarizer 3 into linearly polarized light 103. The light 103 transmitted through the polarizer 3 is transmitted through the liquid crystal cell 5 to become elliptically polarized light 101'. The light transmitted through the cell 5 is transmitted through the optical delay plates 10 and 11 to become substantially linearly polarized light 102'. The light 102' transmitted through the plates 10 and 11 is either transmitted through or interrupted by the polarizer 4 in accordance with its absorbing axis.

According to extensive studies of the present inventors, it is preferable to use two stacked optical delay plates in which one of the optical axes is shifted from the other. If only one optical delay plate is used, light transmitted through the optical delay plate does not become substantially completely linearly polarized light but, more or less, properties of elliptically polarized light remain. For this reason, a portion supposed to display black color, not complete black but gray, results in a less poor contrast. If three or more optical delay plates are used, light transmitted through the optical delay plates becomes more completely linearly polarized light to provide a slightly higher contrast. If three or more optical delay plates are used, however, the liquid crystal display device becomes expensive.

Table 1 shows a change in contrast ratio obtained when only the retardation values of the first and second optical delay plates of the liquid crystal display device of the present invention are variously changed. A driving condition of the liquid crystal display device was always a 1/200 duty. In Table 1, the retardation values of the first and second optical delay plates are represented by only values to be multiplied to the retardation R0 of the liquid crystal layer in the liquid crystal cell. In Table 1, " " represents a contrast ratio of 8 or more, "o" represents a contrast ratio of 5 to 8, "Δ" represents a contrast ratio of 3 to 5, and "x" represents a low contrast ratio or a chromatic display.

formed on substantially parallel substrates 1 and 1', respectively. A liquid crystal composition 9 is filled between the substrates 1 and 1' and sealed by a sealing agent 12 consisting of an epoxy adhesive, thereby forming a liquid crystal cell 5. The cell thickness (substrate spacing) of the cell 5 is 6.6 μm. In the cell 5, the liquid crystal molecules are rotated through twist angle $\Psi=240°$ counterclockwise along the direction from the substrate 1' to the substrate 1 in accordance with an alignment direction r of the substrate 1 and an alignment direction r' of the substrate 1'. In this case, an angle $Ar_2$ of the direction r' is $-30°$ and an angle $Ar_1$ of the direction r is $+210°$ with respect to the reference line. A tilt angle $\theta$ of the liquid crystal molecule is 1.5°.

The liquid crystal composition of the cell 5 was prepared by adding S-811 (available from E. MERCK Co.) as a counterclockwise chiral agent to ZLI3711 (E. MERCK Co.). Since an optical anisotropy Δn of this liquid crystal composition was 0.1045, its retardation $R_0=\Delta n.d.\cos^2\theta$ was about 0.69 μm.

A first optical delay plate 10 consisting of a stretched polyvinyl alcohol is arranged on the substrate 1' such that its stretching direction (optical axis) forms an angle of $A_1=45°$ with respect to the reference line. Similarly, a second optical delay plate 11 consisting of a stretched polyvinyl alcohol is arranged on the first plate 1 such that its stretching direction forms an angle of $A_2=6.5°$ with respect to the reference line. The retardation value R of the first plate 10 was 0.299 μm, and that of the second plate 11 was 0.394 μm. Therefore, a total of the retardation values of the first and second plates was 0.693 μm, or was $R_0 \times 1.0$.

A polarizer 3 is arranged under the substrate so that its absorbing axis forms an angle of $P_1=69°$ with respect to the reference line. A polarizer 4 is arranged on the second plate 11 so that its absorbing axis forms an angle of $P_2=-17°$ with respect to the reference line.

FIG. 6 shows a transmission change with respect to a wavelength change through the liquid crystal cell 5 of this example to set the liquid crystal in an on- or off-state. As is apparent from FIG. 6, the transmission upon either off- or on-state is substantially flat regardless of the wavelength. Therefore, a so-called normally black

TABLE 1

|  |  | \multicolumn{10}{c}{2nd Optical Delay Plate} |
| --- | --- | --- | --- | --- | --- | --- | --- | --- | --- | --- | --- |
|  |  | 0.25 | 0.30 | 0.38 | 0.47 | 0.51 | 0.60 | 0.65 | 0.70 | 0.81 | 0.90 |
| 1st | 0.25 | × | × | × | × | Δ |  |  |  |  |  |
| Optical | 0.30 | × | × | Δ | Δ |  |  |  |  |  |  |
| Delay | 0.38 | × | Δ |  |  |  |  |  |  |  | Δ |
| Plate | 0.47 | × | Δ |  |  |  |  |  |  | Δ | × |
|  | 0.51 | Δ |  |  |  |  |  |  | Δ | × | × |
|  | 0.60 |  |  |  |  |  |  | Δ | Δ | × | × |
|  | 0.65 |  |  |  |  |  | Δ | × | × | × | × |
|  | 0.70 |  |  |  |  |  | Δ | × | × | Δ | × |
|  | 0.81 |  |  |  |  |  | Δ | × | × | × | × |
|  | 0.90 |  |  | Δ | Δ | Δ | × | × | × | × | × |

Two optical delay plates and two substrates were used in each example. However, the first optical delay plate and the second substrate can be constituted by one member.

Examples of the present invention will be described below.

EXAMPLE 1

A liquid crystal display device according to this example will be described below with reference to FIGS. 3 and FIGS. 4A to 4E. Alignment films 8 and 8' consisting of polyimide and transparent electrodes 7 and 7' are mode in which black and white are displayed in off- and on-states, respectively, can be executed.

In addition, when this liquid crystal cell was multiplex-driven at a 1/200 duty, the contrast was high, 11:1.

Furthermore, a viewing angle of this liquid crystal display device is large.

EXAMPLE 2

ZLI1577 (E. MERCK Co.) was used as a liquid crystal composition in place of ZLI3711 used in Example 1. An optical anisotropy Δn of this liquid crystal composition was 0.115. Therefore, a retardation value $R_0$ of this liquid crystal composition was about 0.76 μm.

A first optical delay plate 10 was arranged such that its stretching direction was $A_1 = 90°$ with respect to a reference line, and a second optical delay plate 11 was arranged thereon such that its stretching direction was $A_2 = -37°$ with respect to the reference line. A retardation value R of the first plate 10 was 0.365 μm, and that of the second plate 11 was 0.499 μm. Therefore, a total of the retardation values of the first and second plates was 0.864 μm, or was $R_0 \times 1.14$.

A polarizer 3 was arranged such that its absorbing axis formed an angle of $P_1 = 82°$ with respect to the reference line, and the polarizer 4 was arranged such that its absorbing axis formed an angle of $P_2 = 115°$ with respect to the reference axis.

A display of this liquid crystal display device was a normally black mode. A contrast obtained when the device was driven in the same manner as in Example 1 was high, about 8:1. In addition, a viewing angle was large.

EXAMPLE 3

In the liquid crystal display device of Example 1, first and second optical delay plates and first and second polarizers were arranged as follows.

On the liquid crystal cell used in Example 1, a first optical delay plate having a retardation value of 0.365 μm was arranged such that its stretching direction satisfied $A_1 = 48°$ with respect to a reference line. A second optical delay plate having a retardation value of 0.365 μm was arranged on the first plate such that its stretching direction satisfied $A_2 = 5°$ with respect to the reference line. Therefore, a total of the retardation values of the first and second plates was 0.73 μm, or was $R_0 \times 1.06$.

In addition, a first polarizer 3 was arranged such that its absorbing axis formed an angle of $P_1 = 68°$ with respect to the reference line, and a second polarizer 4 was arranged such that its absorbing axis formed an angle of $P_2 = -40°$ with respect to the reference line.

Figure 7:
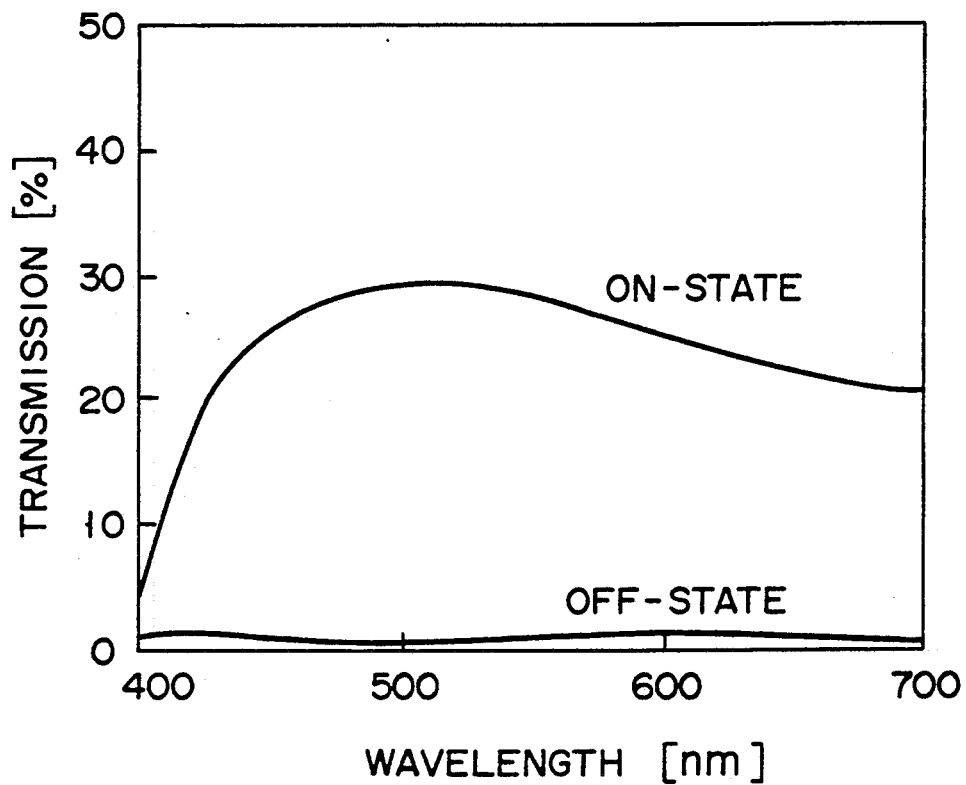
FIG. 7 is a graph showing a transmission change of the another liquid crystal display device according to the present invention with respect to wavelength change.

FIG. 7 shows a change in transmission with respect to a change in wavelength obtained when a voltage was applied to the liquid crystal cell 5 to set the liquid crystal in on- or off-states. As is apparent from FIG. 7, the transmission in the on- and off-states is constant regardless of the wavelength. Therefore, a so-called normally black mode in which black is displayed in the off-state and white is displayed in the on-state can be executed.

A contrast obtained when the device was driven under the same conditions as in Example 1 was high, about 14:1. In addition, a viewing angle was large.

EXAMPLE 4

In the liquid crystal display device of Example 1, first and second optical delay plates and first and second polarizers were arranged as follows.

That is, the first optical delay plate having a retardation value of 0.400 μm was arranged on the liquid crystal cell used in Example 1 such that its stretching direction satisfied $A_1 = 27°$ with respect to reference line. The second optical delay plate having a retardation value of 0.400 μm was arranged on the first plate such that its stretching direction satisfied $A_2 = -22°$ with respect to the reference line. Therefore, a total of the retardation values of the first and second plates was 0.8 μm, or was $R_0 \times 1.16$.

A first polarizer 3 was arranged such that its absorbing axis formed an angle $P_1 = 47°$ with respect to the reference line, and a second polarizer 4 was arranged such that its absorbing axis formed an angle $P_2 = -64°$ with respect to the reference line.

A display of this liquid crystal device was the normally black mode. A contrast obtained when the device was driven under the same conditions as in Example 1 was high, about 12:1. In addition, a viewing angle was large.

COMPARATIVE EXAMPLE

The second optical delay plate 11 was removed from the liquid crystal display device in Example 1 to obtain a comparative example.

Figure 8:
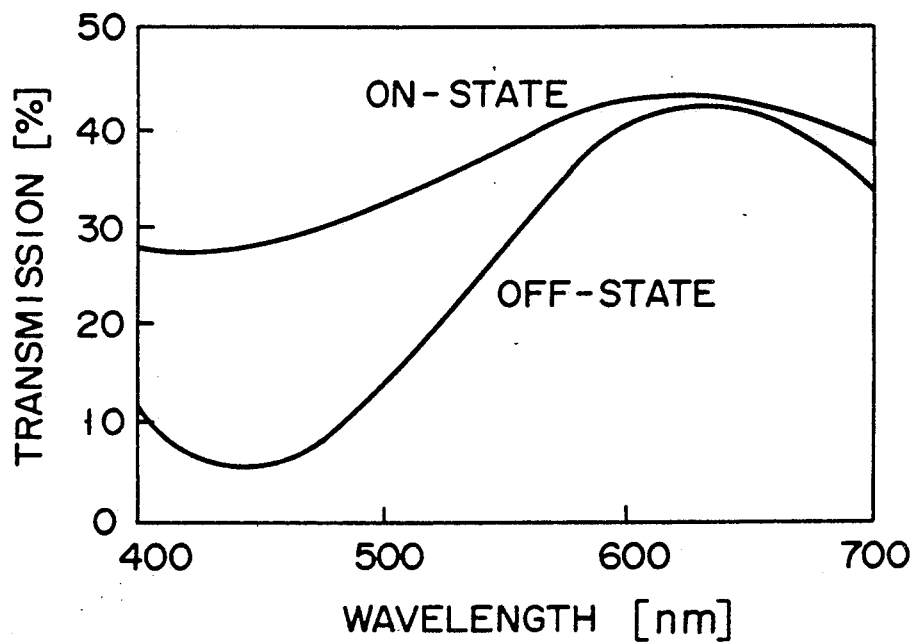
FIG. 8 is a graph showing a transmission change of a liquid crystal display device of a comparative example of the present invention with respect to a wavelength change.

FIG. 8 shows a change in transmission with respect to a change in wavelength obtained when a voltage was applied to the liquid crystal cell 5 to set the liquid crystal in on- or off-states in the comparative example. As is apparent from FIG. 8, a background became chromatic in yellow in the off-state. In the on-state, a display color was white or light yellow, and contrast ratio is small.

What is claimed is:

1. A liquid crystal display device comprising:
   a liquid crystal cell including two substrates which are arranged substantially parallel to each other and have electrodes on opposing surfaces thereof, and a liquid crystal composition being held between said substrates such that the liquid crystal molecules are arranged in a twisted mode of 180° to 360°;
   first and second polarizers arranged at both sides of said liquid crystal cell; and
   first and second optical delay plates arranged between said liquid crystal cell and said second polarizer, with an optical axis of one delay plate being shifted from an optical axis of the other delay plate;
   wherein assuming that a retardation value of said liquid crystal cell is given by:

$$R_0 = \Delta n.d.\cos^2\theta$$

wherein $\Delta n$ is the optical anisotropy of said liquid crystal composition, d is the distance between said two substrates in said liquid crystal cell, and $\theta$ is the tilt angle of said liquid crystal composition, and wherein a total of the retardation values of said first and second optical delay plates is $R_0 \times 0.8$ to $R_0 \times 1.2$.

2. A device according to claim 1, wherein the retardation value of each of said first and second optical delay plates is 0.25 μm to 0.45 μm.

3. A device according to claim 1, wherein each of said first and second optical delay plates comprises a stretched film consisting of polyvinyl alcohol.

4. A device according to claim 1, wherein a retardation value of said first optical delay plate is equal to that of said second optical delay plate.

* * * * *

UNITED STATES PATENT AND TRADEMARK OFFICE
CERTIFICATE OF CORRECTION

PATENT NO. : 4,995,704

DATED : Feb. 26, 1991

INVENTOR(S) : Tomiaki Yamamoto et al

It is certified that error appears in the above-identified patent and that said Letters Patent is hereby corrected as shown below:

ON THE TITLE PAGE:

Please Change: Third Inventor's Name

"(75) Susmu Kondo"  to

--(75) Susumu Kondo --

Signed and Sealed this

Seventeenth Day of November, 1992

Attest:

DOUGLAS B. COMER

Attesting Officer  Acting Commissioner of Patents and Trademarks